US007701958B2

(12) United States Patent
Abrol et al.

(10) Patent No.: US 7,701,958 B2
(45) Date of Patent: Apr. 20, 2010

(54) COMMUNICATION SYSTEM SUPPORTING TRANSITION BETWEEN NETWORK COMMUNICATIONS PROTOCOLS

(75) Inventors: Nischal Abrol, San Diego, CA (US); Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1188 days.

(21) Appl. No.: 10/188,654

(22) Filed: Jul. 2, 2002

(65) Prior Publication Data
US 2004/0004940 A1 Jan. 8, 2004

(51) Int. Cl.
H04J 3/17 (2006.01)
(52) U.S. Cl. .................... 370/433; 370/395.4; 370/466; 370/401; 709/245
(58) Field of Classification Search ................. 370/466, 370/310, 352, 392, 395.4, 468, 252, 433, 370/401, 353, 328; 455/433; 709/238, 245, 709/230, 246
See application file for complete search history.

(56) References Cited

U.S. PATENT DOCUMENTS

| 6,038,233 | A  | * | 3/2000  | Hamamoto et al. | ......... | 370/401 |
| 6,118,784 | A  |   | 9/2000  | Tsuchiya et al. |           |         |
| 6,580,717 | B1 | * | 6/2003  | Higuchi et al.  | ...........| 370/401 |
| 6,601,093 | B1 | * | 7/2003  | Peters          | ..........| 709/220 |
| 6,618,757 | B1 | * | 9/2003  | Babbitt et al.  | ............| 709/226 |
| 6,697,354 | B1 | * | 2/2004  | Borella et al.  | ............| 370/352 |
| 6,708,219 | B1 | * | 3/2004  | Borella et al.  | ............| 709/245 |
| 6,862,274 | B1 | * | 3/2005  | Tsao et al.     | ............| 370/338 |
| 6,888,845 | B2 | * | 5/2005  | Watanuki et al. | ............| 370/466 |
| 6,944,147 | B2 | * | 9/2005  | Chheda          | ..........| 370/342 |
| 6,961,322 | B2 | * | 11/2005 | Viola et al.    | ............| 370/328 |
| 7,050,452 | B2 | * | 5/2006  | Sugar et al.    | ............| 370/465 |
| 7,061,880 | B2 | * | 6/2006  | Basilier        | ..........| 370/312 |
| 7,191,226 | B2 | * | 3/2007  | Flykt et al.    | ............| 709/218 |

(Continued)

FOREIGN PATENT DOCUMENTS

WO        0131888        5/2001

OTHER PUBLICATIONS

G. McGregor, (1992) The PPP internet protocol control protocol (IPCP). Network Working Group, XP-002123909.

(Continued)

*Primary Examiner*—Ayaz R Sheikh
*Assistant Examiner*—Chuong T Ho
(74) *Attorney, Agent, or Firm*—Kristine U. Ekwueme

(57) ABSTRACT

This disclosure is directed to techniques for supporting transition between network communication protocols in a communication network. The techniques may be applicable to different network communication protocols, but are especially useful in the transition from the IPv4 communication protocol to the IPv6 communication protocol in a wireless communication network. In general, to reduce consumption of scarce IPv4 address during the transition period, a network communication device implementing a dual IPv4/IPv6 stack acquires an IPv4 address only when necessary to communicate with IPv4 resources on the network. The network communication device uses an IPv6 address at the start of a communication session, and does not acquire an IPv4 address unless a need arises later in the session for communication with an IPv4 resource. The IPv4 address may be acquired for a limited period of time, such as fixed period of time or a period of actual usage, to further promote availability of IPv4 addresses.

37 Claims, 4 Drawing Sheets

U.S. PATENT DOCUMENTS

| | | | |
|---|---|---|---|
| 7,385,989 B2* | 6/2008 | Higuchi et al. | 370/395.54 |
| 2002/0186696 A1* | 12/2002 | Lim | 370/395.52 |
| 2002/0194259 A1* | 12/2002 | Flykt et al. | 709/202 |
| 2003/0193965 A1* | 10/2003 | Higuchi et al. | 370/466 |
| 2004/0022212 A1* | 2/2004 | Chowdhury et al. | 370/329 |
| 2004/0205233 A1* | 10/2004 | Dunk | 709/238 |

OTHER PUBLICATIONS

W. Simpson, (1994) The point-to-point protocol (PPP). Network Working Group, XP-002150336.

J. Bound, et al., (2002) Dual stack transition mechanism (DSTM). NGTRANS Working Group, XP-002258146.

3GPP2, (2001) XP-002258147, p. 310-313.

J. Wiljakka, (2002) XP-002258148, pp. 312-340.

3GPP2 TSG-P Wireless packet data networking. XP-002258149, pp. 1-61.

International Search Report—PCT/US03/021234, International Searching Authority—European Patent Office. Nov. 10, 2003.

International Preliminary Examination Report—PCT/US03/021234—IPEA/US, Alexandria. VA Jun. 23, 2004.

* cited by examiner

COMMUNICATION SYSTEM SUPPORTING TRANSITION BETWEEN NETWORK COMMUNICATIONS PROTOCOLS

TECHNICAL FIELD

The disclosure relates to network communication and, more particularly, use of different network communication protocols within a network.

BACKGROUND

In a communication network, network nodes exchange data using network communication protocols. Internet Protocol (IP) is an example of a network communication protocol that facilitates packetized data communication between network nodes. In an IP based network, each network node has an IP address. Existing networks generally use 32-bit IP addresses according to IP Version 4 (IPv4). In particular, a packet sent between two network nodes generally includes a header with a source IP address and a destination IP address. The source address identifies the node that sends the packet, and the destination address identifies the intended recipient of the packet.

Wireless communication networks conforming to the TIA IS-835 standard, for example, rely on the IPv4 address space to identify wireless nodes ranging from network equipment to mobile wireless communication devices. Dense mobile networks with millions of individually addressable nodes have resulted in rapid depletion of the 32-bit address space provided by IPv4. With the limitations imposed by the IPv4 address space, network carriers have contemplated a shift to the 128-bit address space provided by IP Version 6 (Ipv6).

The transition from IPv4 to IPv6 presents some challenges. For example, a complete and sudden transition to IPv6 would disrupt access to existing IPv4 resources on the network. The use of address translation between IPv4 and IPv6 address spaces can ease the transition, but generally presents undesirable processing overhead, expensive use of the air interface, and excessive power consumption.

The use of a so-called "dual stack" approach in which each wireless communication device supports communication with either the IPv4 or IPv6 protocol is another solution for transition. During the transition period, however, the typical dual stack implementation requires assignment of both IPv4 and IPv6 addresses to the wireless communication devices. The dual stack approach results in excessive consumption of IPv4 addresses, which is the precise reason that transition to IPv6 addressing has been undertaken.

The IPv4 addresses can only be phased out after an extended transition period in which all or a large majority of the network nodes have migrated to the IPv6 capabilities. In the meantime, the IPv4-IPv6 transition remains a challenge, particularly for wireless communication systems providing mobile IP services.

SUMMARY

This disclosure is directed to techniques for supporting transition between network communication protocols in a network. The techniques can be applied to different network communication protocols, but will be described in the context of transition from the IPv4 communication protocol to the IPv6 communication protocol. In general, the techniques may be practiced in the context of a dual-stack network communication device that supports both a first network communication protocol, e.g., IPv6, and a second network communication protocol, e.g., IPv4. Although the techniques are applicable to both wired and wireless communication devices, they may be especially useful in a mobile wireless communication network.

In general, to reduce consumption of scarce IPv4 addresses during the IPv4-IPv6 transition period, a mobile wireless communication device implementing a dual IPv4/IPv6 stack acquires an IPv4 address only when necessary to communicate with IPv4 resources on the network. The wireless communication device uses an IPv6 address at the start of a communication session, but does not obtain an IPv4 unless a need arises later in the communication session for communication with an IPv4 network resource. In addition, the IPv4 address may be obtained for a limited period of time, such as fixed period of time or a period of actual usage. Upon expiration of the period of time or termination of actual usage, the mobile wireless communication device may release the IPv4 address to further promote availability of IPv4 addresses.

In an exemplary embodiment, this disclosure provides a method comprising automatically using a first address corresponding to a first network communication protocol for a mobile wireless communication device upon commencement of a communication session, and selectively obtaining a second address corresponding to a second network communication protocol for the mobile wireless communication device when initiating communication with a network resource that communicates according to the second network protocol. The first network communication protocol may be IPv6, and the second network communication protocol may be IPv4. In other embodiments, this disclosure provides a device, wireless communication network and computer-readable medium capable of performing such a method.

In another embodiment, the disclosure provides a wireless communication network comprising one or more first network nodes that communicate according to a first network communication protocol, one or more second network nodes that communicate according to a second network communication protocol, a packet data serving node (PDSN) that provides addresses corresponding to the second network communication protocol, and a mobile wireless communication device capable of communicating according to the first network communication protocol and the second network communication protocol. The mobile wireless communication device automatically uses an address corresponding to the first network communication protocol upon commencement of a communication session, and selectively obtains an address corresponding to the second network communication protocol when communication with a network resource that communicates according to the second network protocol is necessary. The first network communication protocol may be IPv6, and the second network communication protocol may be IPv4.

In some cases, the techniques also may be applied to communication devices in wired networks. Accordingly, although the techniques are generally described herein in the context of wireless communication, application to wired communication devices is also contemplated. In those applications, the techniques may involve automatically using a first address corresponding to a first network communication protocol for a network communication device upon commencement of a communication session, and selectively obtaining a second address corresponding to a second network communication protocol for the network communication device when initiating communication with a network resource that communicates according to the second network protocol.

The techniques described herein may be implemented in hardware, software, firmware, or any combination thereof. If implemented in software, the techniques may be directed to a computer readable medium comprising program code, that when executed, performs one or more of the techniques described herein.

The details of one or more embodiments are set forth in the accompanying drawings and the description below. Other features, objects, and advantages of the invention will be apparent from the description and drawings, and from the claims.

DETAILED DESCRIPTION

Figure 1:
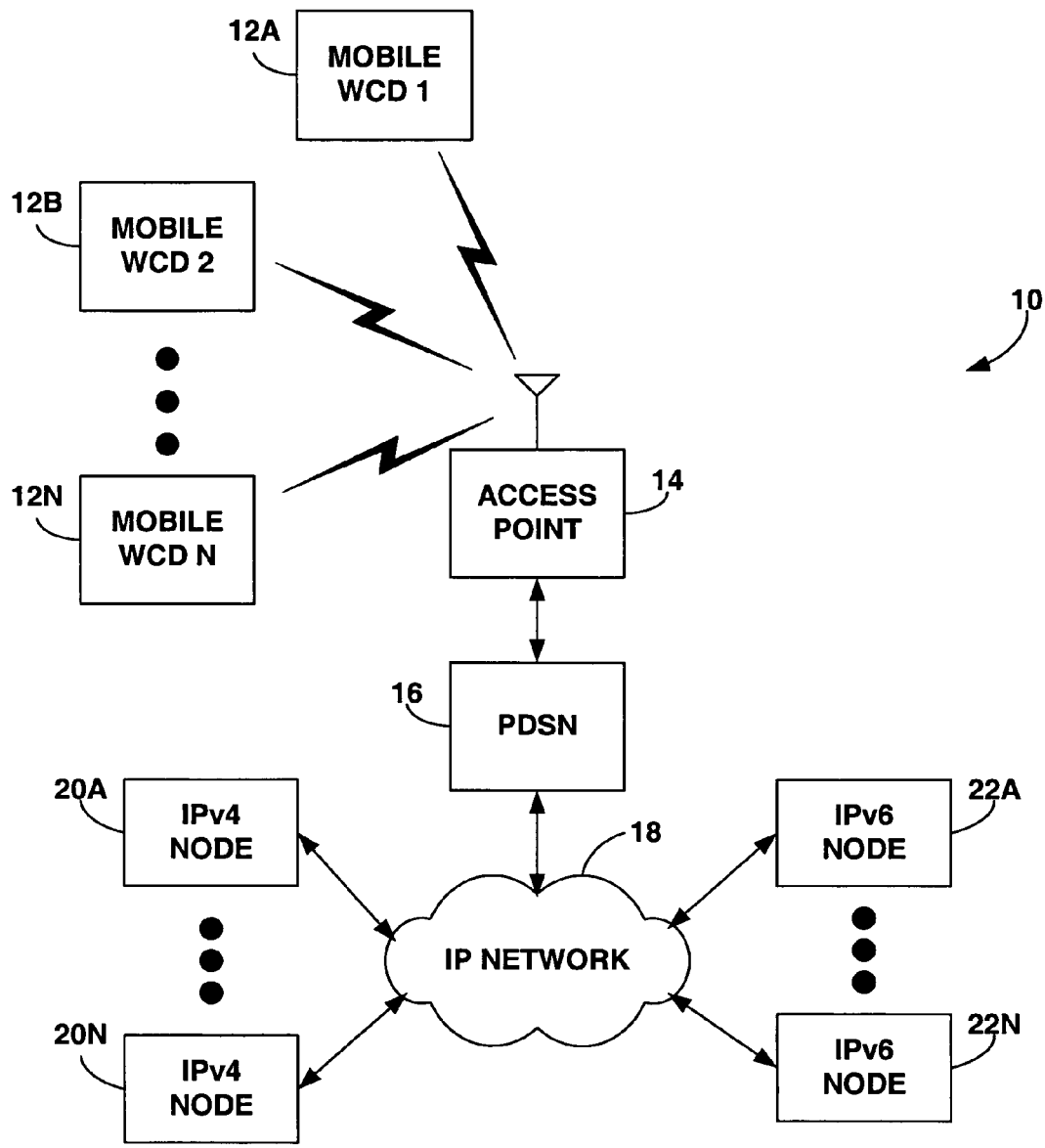
FIG. 1 is a block diagram illustrating a wireless communication network.

FIG. 1 is a block diagram illustrating a wireless communication network 10. As shown in FIG. 1, wireless communication network 10 includes one or more network communication devices, such as mobile wireless communication devices (WCDs) 12A-12N (collectively mobile WCDs 12). Mobile WCDs 12 communicate with a wireless network access point 14 via a wireless communication channel. A packet data serving node (PDSN) 16 is coupled between wireless access point 14 and an IP network 18, e.g., the Internet. Multiple IPv4 network nodes 20A-20N (collectively IPv4 nodes 20) and IPv6 network nodes 22A-22N (collectively IPv6 nodes 22) communicate with PDSN 16 via IP network 18.

Mobile WCDs 12 send and receive data via the wireless communication channel, and may take the form of cellular radiotelephones, satellite radiotelephones, PCMCIA cards incorporated within portable computers, personal digital assistants (PDAs) equipped with wireless communication capabilities, and the like. In addition, mobile WCDs 12 may include voice communication capabilities, particularly when embodied as a mobile handset. Mobile WCDs 12 may employ a variety of communication techniques, such as code division multiple access (CDMA), time division multiple access (TDMA), or frequency division multiple access (FDMA), for communication over a wireless communication channel. In some embodiments, the techniques described herein also may be applied to wired communication devices.

Wireless network access point 14 may take the form of a base station antenna and controller equipped for data communication, voice communication, or both. PDSN 16 serves as a remote device for assignment of IP addresses to mobile WCDs 12. In particular, PDSN 16 is responsible for assigning IP addresses to mobile WCDs 12, and establishing and supporting IP traffic between the mobile WCDs and IP network 18. IPv4 nodes 20 are capable of communicating according to the IPv4 network communication protocol, and may take the form of a variety of network resources such as web servers, database servers, web clients, I/O devices, and the like. Similarly, IPv6 nodes 22 are capable of communicating according to the IPv6 network communication protocol, and may take forms similar to IPv4 nodes 20. PDSN 16 may be equipped to act as a foreign agent for mobile WCDs 12, handling care-of-addressing and negotiation with home agents (not shown) coupled to IP network 18. In some embodiments, the techniques described herein may be applied to wired network servers that provide network addresses to network communication devices.

For data communication, mobile WCDs 12 may take the form of dual stack devices that are capable of communication according to both a first network communication protocol, e.g., IPv6, and a second network communication protocol, e.g., IPv4. In other words, mobile WCDs 12 implement both an IPv4 protocol stack and an IPv6 protocol stack, each configured for mobile applications. In accordance with this disclosure, mobile WCDs 12 may be equipped to support transition between network communication protocols within wireless communication network. In particular, mobile WCDs 12 may have one or more permanently assigned IPv6 addresses, and may be configured to obtain an IPv4 address only when necessary to communicate with IPv4 resources within wireless communication network 10, e.g., one of IPv4 nodes 20. In some applications, the IPv6 addresses may be dynamically assigned to mobile WCDs 12.

Mobile WCDs 12 may be configured to use an IPv6 address from the start of a communication session. For example, upon commencement of a point-to-point protocol (PPP) session in a network 10 that supports both IPv4 and IPv6, mobile WCD 12 may negotiate both Internet Protocol Control Protocol (IPCP) and Internet Protocol Control Protocol version 6 (IPCPv6). Mobile WCD 12 may determine that both IPv4 and IPv6 service is available within network 10 by detecting, e.g., upon powerup or the beginning of a call, whether PDSN 16 transmits an IPCPv6 C-Req (configuration request).

Upon negotiating IPCP and IPCPv6, however, mobile WCD 12 is configured to not immediately request an IPv4 address from PDSN 16. Mobile WCD 12 does not request an IPv4 address unless an actual need arises in the course of the PPP session for communication with an IPv4 resource, e.g., one of IPv4 nodes 20. Until that time, mobile WCD 12 operates with an IPv6 address and communicates according to the IPv6 network communication protocol. In this manner, IPv4 addresses can be more effectively conserved within wireless communication network 10.

When mobile WCD 12 needs to communicate with an IPv4 node 20, i.e., when the mobile WCD needs to send the first IPv4 packet in the PPP session, it requests an IPv4 address from PDSN 16. There are a variety of ways in which mobile WCD 12 may obtain an IPv4 address in the course of a PPP session. As one example, mobile WCD 12 may obtain the IPv4 address by sending a mobile IP agent solicitation with a source IP address of 0.0.0.0. In response, PDSN 16 sends an agent advertisement. Upon receiving the agent advertisement, mobile WCD 12 sends a registration request (RRQ) to PDSN 16. PDSN 16 forwards the registration request to a home agent assigned to mobile WCD 12. The home agent assigns an IPv4 address to mobile WCD 12. PDSN 16 then sends a registration reply (RRP) containing the IPv4 address to mobile WCD 12. In this manner, PDSN 16 provides mobile WCD 12 with the IPv4 address. From this point, mobile WCD 12 can communicate using IPv4, and thereby exchange packets with other IPv4 nodes 20 on IP network 18.

Obtaining the IPv4 address for mobile WCD 12 only when IPv4 communication is actually needed conserves the number of available IPv4 addresses within wireless communication network 10. Even though mobile WCD 12 may be a dual stack device, it does not consume an IPv4 address unless IPv4 communication is needed. Instead, mobile WCD 12 implements a "selective" dual stack. Mobile WCD 12 initiates the PPP session with an IPv6 address automatically, and continues to communicate according to IPv6 until a request for communication with an IPv4 node 20 arises. At that time, mobile WCD 12 may selectively request an IPv4 address. In addition to conserving IPv4 addresses, in some embodiments, the selective dual stack arrangement can avoid the need for IPv4-IPv6 address translation, and the associated processing overhead, air interface usage and power consumption.

To further promote conservation of IPv4 addresses, mobile WCD 12, PDSN 16, or both may be configured to release or withdraw, respectively, an IPv4 address in response to expiration of a period of time, e.g., a limited IP lease time, or in response to termination of a communication with an IPv4 node 20. In other words, in some exemplary embodiments, the IPv4 address, once assigned, may be retained for either a limited period of time or the time during which IPv4 communication is actually needed.

The period of time for retention of the IPv4 address may be a fixed period of time that is predetermined for all mobile WCDs 12. Alternatively, the period of time may vary, e.g., based on the level of consumption of IPv4 addresses within wireless communication network 10. Also, it may be desirable to set the period of time on a per-user basis, so that legacy mobile WCDs 12 having only IPv4 communication capabilities are not given exceedingly short lease times. To distinguish dual stack mobile WCDs 12 from IPv4-only mobile WCDs, the dual stack mobile WCDs may be configured to request shorter lease times in registration requests. In each case, PDSN 16, or alternatively the home agent for the mobile WCD or an applicable Authentication, Authorization and Accounting (AAA) server, may be responsible for determining the period of time applicable to IPv4 addresses. However, either PDSN 16 or mobile WCD 12 or both may be configured to track the period of time and expiration.

Upon expiration of the period of time or completion of communication between mobile WCD 12 and an Ipv4 node 20, PDSN 16 may send a termination notification to mobile WCD 12. The termination notification may advise mobile WCD 12 that the present IPv4 address has expired and will no longer be valid within wireless communication network 12. Alternatively, the termination notification may be generated internally by mobile WCD 12 in the event the mobile WCD tracks expiration of the lease time or completion of communication. Mobile WCD 12 may respond by releasing the IPv4 address, and can be configured to not immediately reregister following release of the IPv4 address unless a new IPv4 communication is required. As a result, a single mobile WCD 12 retains an IPv4 address for only a fixed period of time, which may be determined by PDSN 16 and, ultimately, the network carrier.

In some embodiments, PDSN 16 may be configured to mandate release of an IPv4 address upon consent by mobile WCD 12. In this case, if further IPv4 communication is anticipated, mobile WCD 12 may be permitted to retain the IPv4 address for a limited period of time. Alternatively, PDSN 16 may simply invalidate the IPv4 address unilaterally, in which case further IPv4 communications by mobile WCD 12 will be ineffective. Also, if PDSN 16 invalidates the IPv4 address and mobile WCD 12 received the address through Mobile IP, the PDSN can also advise the home agent for the mobile WCD that the pertinent IPv4 address has been released and that the home agent is free to assign the address to some other device. In either case, if the IPv4 address is released, to commence further IPv4 communication, mobile WCD 12 may restart the registration process with PDSN 16 to obtain another IPv4 address.

If wireless communication network 10 is a Simple IPv4 network, when mobile wireless communication device 12 determines that both IPv4 and IPv6 service are available, it may be configured to negotiate IPCPv6 without negotiating IPCPv4 upon initiation of a PPP session. Notably, in some other wireless networks, in which PPP is not used, there may be other modes for obtaining an IPv4 address. When mobile wireless communication device 12 needs to send or receive an IPv4 packet, it sends an IPCP C-Req and, in reply, receives an IPv4 address from PDSN 16. Mobile wireless communication device 12 thereafter engages in IPv4 communication subject to possible lease time or usage limitations as described herein.

If PDSN 16 begins to exhaust its supply of IPv4 addresses, it can begin to withdraw the addresses from mobile WCDs 12 on a proactive basis, e.g., by sending an IPCP T-Req (termination request) to selected mobile WCDs. PDSN 16 may undertake this operation when IPv4 addresses are scarce even if applicable lease time periods have not expired. For example, PDSN 16 may track mobile WCDs 12 that have not received or sent IPv4 traffic for an extended period of time, and withdraw addresses from those mobile WCDs first.

Figure 2:
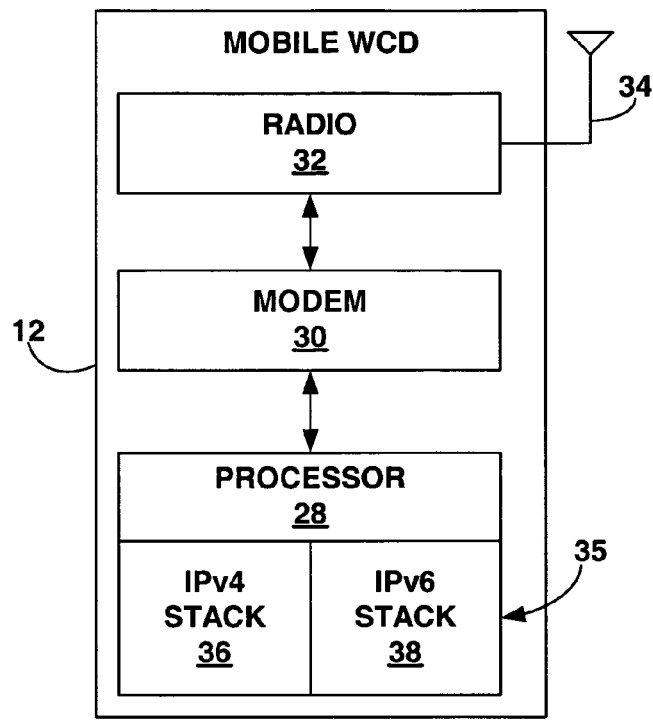
FIG. 2 is a block diagram illustrating a mobile wireless communication device (WCD).

FIG. 2 is a block diagram illustrating an exemplary mobile WCD 12 that may be used in wireless communication network 10 of FIG. 1. As shown in FIG. 2, mobile WCD 12 may include a processor 28, modem 30, radio circuit 32, antenna 34, and memory 35. Memory 35, which may take the form of FLASH, ROM, or the like, stores code executed by processor 28 to implement a dual protocol stack. In particular, processor 28 implements a dual protocol stack, represented by IPv4 stack 36 and IPv6 stack 38, to send and receive IP-based packets. Modem 30 modulates and demodulates packets transmitted and received via radio circuitry 32 and antenna 34.

Processor 28 automatically uses an IPv6 address for wireless communication upon commencement of a communication session, e.g., a PPP session. The IPv6 address may be permanently or dynamically assigned to processor 28. In addition, mobile WCD 12 may have multiple IPv6 addresses. Processor 28 selectively obtains an IPv4 address, however, when communication with a network resource that communicates according to IPv4 is necessary.

As described with reference to FIG. 1, processor 28 may be configured to retain the IPv4 address for a period of time, e.g., a lease time, or for the duration of a communication session with an IPv4 node 20. Upon expiration of the period of time or detection of completion of the communication session, or upon determination that all IPv4 communication applications have finished, processor 28 may release the IPv4 address, permitting it to be reassigned by PDSN 16. Alternatively, processor 28 may release the IPv4 address in response to a termination notification sent by PDSN 16 in the event the PDSN tracks lease time or usage time.

Figure 3:
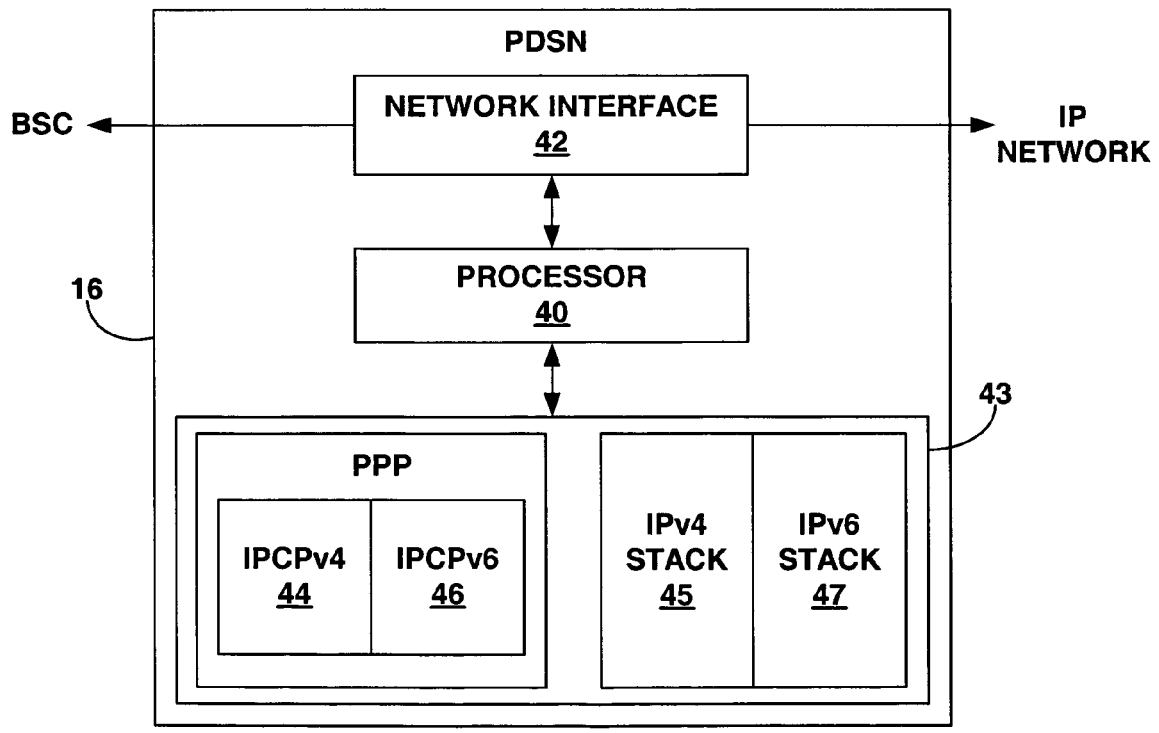
FIG. 3 is a block diagram illustrating a packet date serving node (PDSN).

FIG. 3 is a block diagram illustrating a PDSN 16 that may be used in wireless communication network 10 of FIG. 1. As shown in FIG. 3, PDSN 16 may include a processor 40, a network interface 42, and memory 43 storing instructions for execution by processor 40. PDSN 16 is configured to handle PPP negotiation, including IPCPv4 and IPCPv6 processes 44, 46, respectively. In particular, PDSN 16 may serve as a foreign agent for mobile WCDs 12 that enter an area served by access point 14 and PDSN 16, and provide IPCP and mobile IP registration services. Also, when Mobile IPv4 is used, PDSN 16 acts as the foreign agent. As further shown in FIG. 3, PDSN 16 executes IPv4 and IPv6 network protocol stacks 45, 47.

In addition, in the course of IPCP or registration, PDSN 16 provides IPv4 addresses to mobile WCDs 12 that request them. In this manner, PDSN 16 supports a technique for assignment of IPv4 address on an as-needed basis, thereby conserving IPv4 addresses. Once an IPv4 address has been assigned, PDSN 16 may assign a lease period and monitor elapsed time. Upon expiration of the lease period, PDSN 16 may send a termination notification to a mobile WCD 12 to request that the IPv4 address be released. Alternatively, PDSN 16 may unilaterally withdraw the IPv4 address from a mobile WCD 12 upon expiration of the lease time.

As a further alternative, PDSN 16 may monitor IPv4 traffic to and from mobile WCD 12 and detect a period of inactivity, i.e., a period in which no IPv4 traffic is transmitted to or sent by the mobile WCD 12. In this case, PDSN 16 may withdraw the IPv4 address or send a termination notification to mobile WCD 12, requesting release of the IPv4 address.

Figure 4:
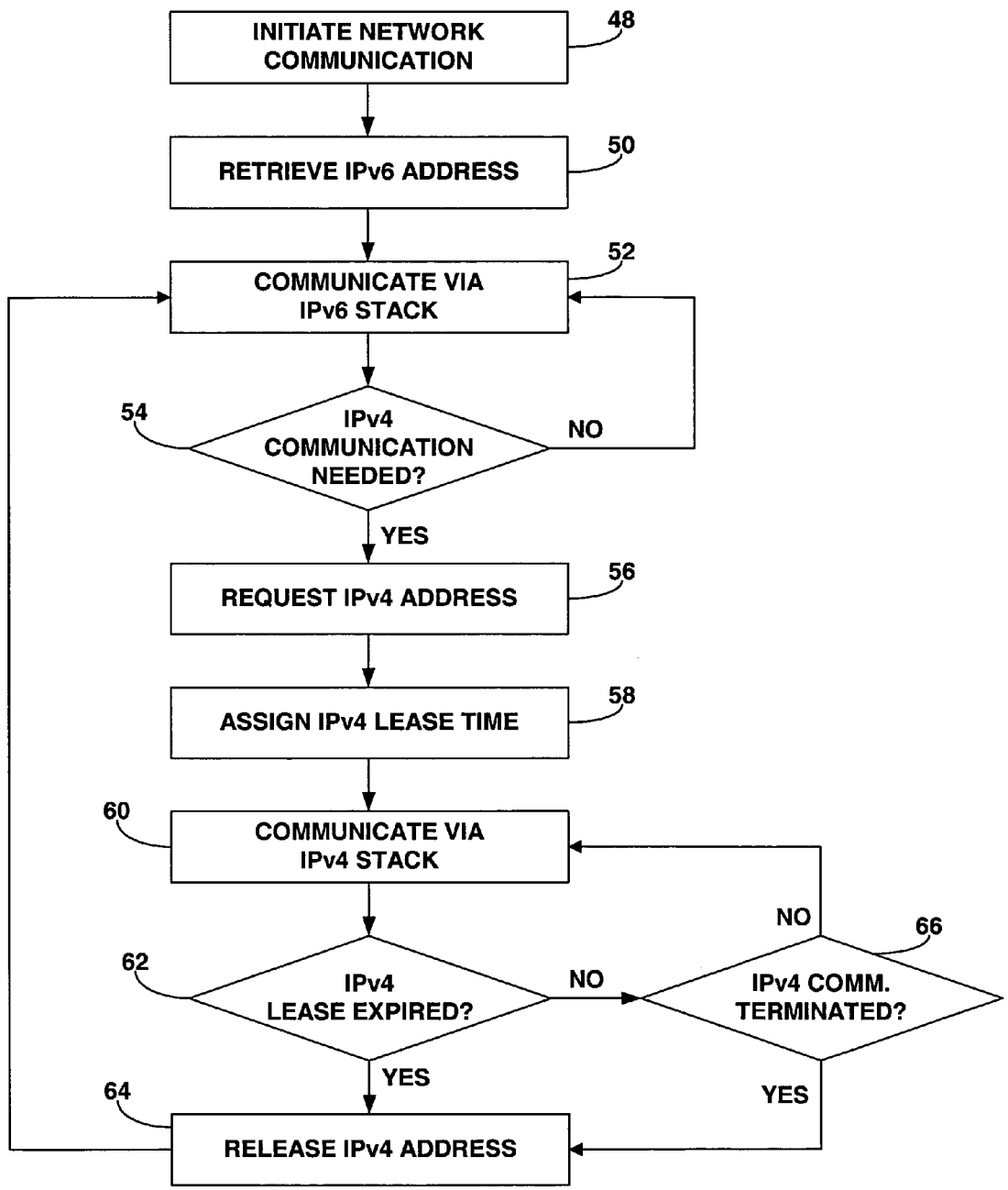
FIG. 4 is a flow diagram illustrating a technique for obtaining IPv4 addresses for use in a wireless communication network.

FIG. 4 is a flow diagram illustrating a technique for obtaining IPv4 addresses for use in wireless communication network 10. As shown in FIG. 4, when a mobile WCD 12 initiates a network communication session (48), it automatically retrieves an IPv6 address (50) from local memory for use in the communication session. In this example, the IPv6 address is permanently assigned to mobile WCD 12. In other cases, the IPv6 address may be dynamically assigned, e.g., upon interaction with PDSN 16. Thereafter, mobile WCD 12 communicates via the IPv6 stack (52) with IPv6 nodes on network 10.

When IPv4 communication is needed (54), mobile WCD 12 requests an IPv4 address (56) from PDSN 16. Upon assignment of the IPv4 address and an IPv4 lease time (58), mobile WCD 12 communicates via the IPv4 stack (60), e.g., concurrently with the IPv6 stack. In other words, upon assignment of the IPv4 address, mobile WCD 12 may communicate using either the IPv4 stack or the IPv6 stack. When the IPv4 lease time expires (62), mobile WCD 12 releases the IPv4 address (64). Alternatively, if the IPv4 lease time has not expired, but the IPv4 communication has terminated (66), mobile WCD 12 likewise releases the IPv4 address (64).

Figure 5:
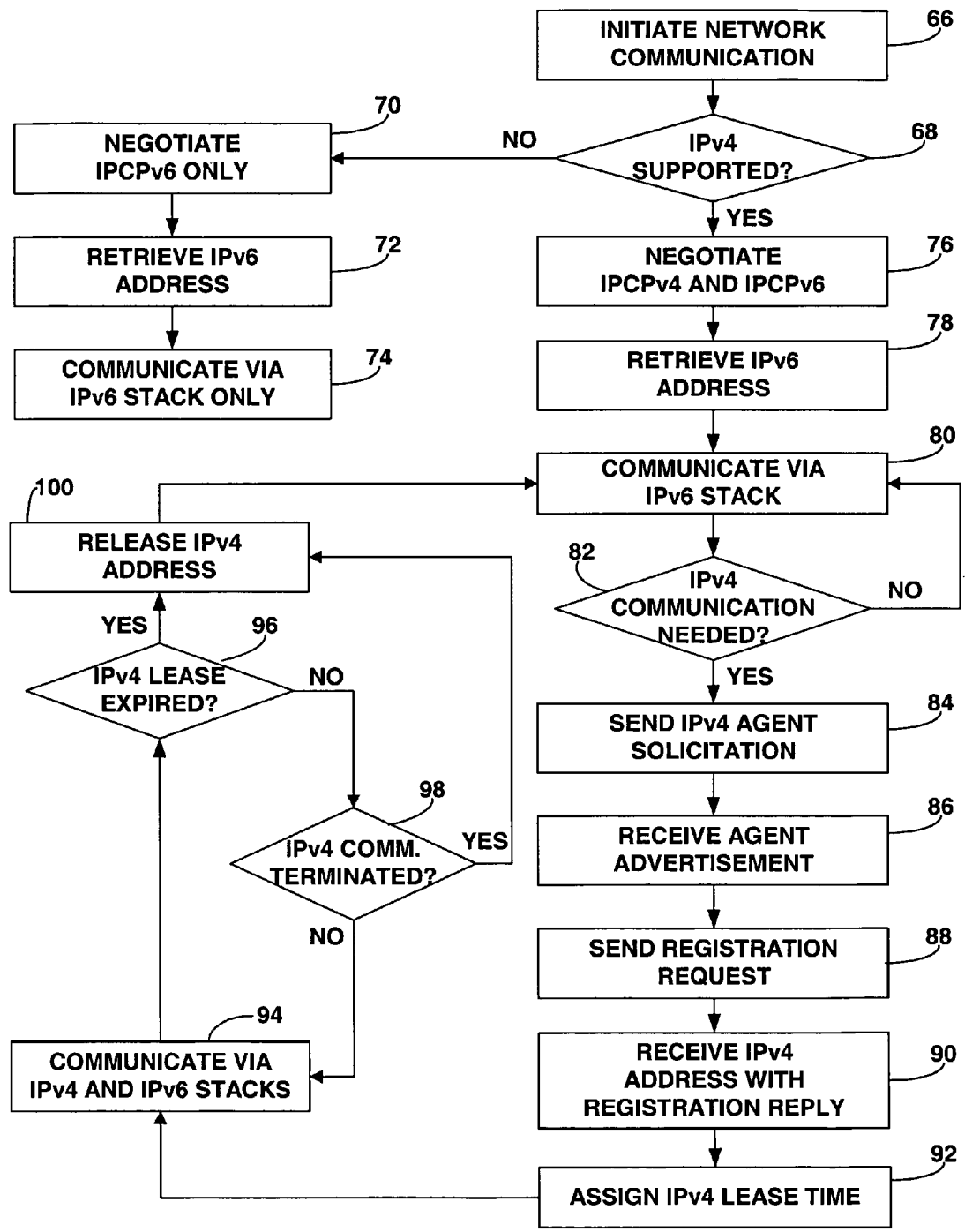
FIG. 5 is a flow diagram illustrating the technique of FIG. 4 in further detail.

FIG. 5 is a flow diagram illustrating the technique of FIG. 4 in further detail. As shown in FIG. 5, when a mobile WCD 12 initiates a communication session (66), mobile WCD 12 may first determine whether IPv4 service is supported within the service area in which the mobile WCD 12 presently resides (68). In other words, mobile WCD 12 determines whether the network equipment, e.g., PDSN 16, supports IPv4 service. If not, mobile WCD 12 negotiates IPCPv6 only (70) and retrieves the IPv6 address assigned to the mobile WCD (72). Thereafter, mobile WCD 12 communicates via the IPv6 stack only (74). If IPv4 service is available, however, mobile WCD 12 negotiates both IPCPv4 and IPCPv6 (76) with PDSN 16, but does not immediately request an IPv4 address. Instead, mobile WCD 12 initially retrieves the IPv6 address (78) and communicates via the IPv6 stack (80).

When IPv4 communication is needed (82), mobile WCD 12 requests an IPv4 address from PDSN 16 by sending an IPv4 agent solicitation (84). In response, mobile WCD 12 receives an agent advertisement (86) from PDSN 16, and then sends a registration request (86) to the agent (PDSN 16). Mobile WCD 12 receives the IPv4 address with the registration reply (90), assigns the IPv4 lease time (92), and then communicates via the IPv4 stack (94). In particular, upon assignment of the IPv4 address, mobile WCD 12 is capable of communicating via the IPv4 stack or the IPv6 stack. When the IPv4 lease expires (96), or the IPv4 communication is terminated (98), mobile WCD 12 releases the IPv4 address (98), and then communicates via the IPv6 stack only (80).

Various embodiments have been described, primarily in the context of wireless communication network. However, some embodiments may involve application of the techniques described herein to wired devices. These and other embodiments are within the scope of the following claims.

The invention claimed is:

1. A mobile wireless communication device that uses a first address corresponding to a first network communication protocol upon commencement of a communication session with a network resource in a network supporting the first network communication protocol and a second network communication protocol, and subsequently requests a second address corresponding to the second network communication protocol if the network resource uses the second network communication protocol, wherein the second address is usable for a variable period of time that is set according to a network-determined factor;

wherein the first address is an Internet Protocol version 6 (IPv6) address, and the second address is an Internet Protocol version 4 (IPv4) address;

wherein the network-determined factor comprises whether the device has communication capabilities using only the second network communication protocol or with both the first network communication protocol and the second network communication protocol, wherein the period of time is greater if the device has communication capabilities using only the second network communication protocol compared to if the device has communication capabilities using both the first network communication protocol and the second network communication protocol.

2. The device of claim 1, wherein the device releases the IPv4 address prior to expiration of the period of time based on a termination request received from the network, wherein the termination request is based on a level of exhaustion of a supply of IPv4 addresses in the network.

3. The device of claim 1, wherein the device releases the IPv4 address in response to a message from a remote device indicating the expiration of the period of time.

4. The device of claim 1, wherein the device releases the Ipv4 address in response to termination of the communication with the network resource.

5. The device of claim 1, wherein the device requests the IPv4 address by sending an Internet Protocol Control Protocol (IPCP) request from the mobile wireless communication device to a remote device.

6. The device of claim 1, wherein the device requests the IPv4 address by sending a registration request, and receives the Ipv4 address with a registration reply.

7. The device of claim 1, wherein the device requests the IPv4 address by sending an Internet Protocol Control Protocol (IPCP) request to a remote device.

8. The device of claim 1, wherein the device obtains the IPv4 address automatically upon commencement of a communication session when IPv6 service is not available.

9. The device of claim 1, wherein the device does not consume an Internet Protocol version 4 (IPv4) address unless IPv4 communication is needed with an IPv4 network resource.

10. The device of claim 1, wherein the network-determined factor comprises consumption of second addresses in the network, wherein the period of time is reduced with increasing consumption.

11. A method, comprising:

using for a mobile wireless communication device a first address corresponding to a first network communication protocol upon commencement of a communication session with a network resource in a network supporting the first network communication protocol and a second network communication protocol; and subsequently requesting for the mobile wireless communication device a second address corresponding to the second network communication protocol if the network resource uses the second network communication protocol, wherein the second address is usable for a variable period of time that is set according to a network-determined factor;

wherein the first address is an Internet Protocol version 6 (IPv6) address, and the second address is an Internet Protocol version 4 (IPv4) address;

wherein the network-determined factor comprises whether the device has communication capabilities using only the second network communication protocol or with both the first network communication protocol and the second network communication protocol, wherein the period of time is greater if the device has communication capabilities using only the second network communication protocol compared to if the device has communication capabilities using both the first network communication protocol and the second network communication protocol.

12. The method of claim 11, further comprising releasing the IPv4 address prior to expiration of the period of time based on a termination request received from the network, wherein the termination request is based on a level of exhaustion of a supply of IPv4 addresses in the network.

13. The method of claim 11, further comprising tracking the period of tune within the mobile wireless communication device, and causing the mobile wireless communication device to release the IPv4 address upon expiration of the period of time.

14. The method of claim 11, further comprising causing the mobile wireless communication device to release the IPv4 address in response to a message from a remote device indicating the expiration of the period of time.

15. The method of claim 11, further comprising releasing the second address in response to termination of the communication with the network resource.

16. The method of claim 11, wherein the first address is an Internet Protocol version 6 (IPv6) address, the second address is an Internet Protocol version 4 (IPv4) address, and requesting the second address includes sending an Internet Protocol Control Protocol version 4 (IPCPv4) request from the mobile wireless communication device to a remote device.

17. The method of claim 11, wherein the first address is an Internet Protocol version 6 (IPv6) address, the second address is an Internet Protocol version 4 (IPv4) address, and requesting the IPv4 address includes sending a registration request and receiving the IPv4 address with a registration reply.

18. The method of claim 11, further comprising obtaining the second address automatically upon commencement of a communication session when service corresponding to the first network communication protocol is not available.

19. The method of claim 11, wherein the network-determined factor comprises consumption of second addresses in the network, wherein the period of time is reduced with increasing consumption.

20. A wireless communication network comprising:
at least one first network node that communicates according to a first network communication protocol;
at least one second network node that communicates according to a second network communication protocol;
a network access point that provides addresses corresponding to the second network communication protocol, wherein for a mobile wireless communication device configured to communicate according to the first network communication protocol and the second network communication protocol, the network access point is operable to:

initially assign the device a first address corresponding to the first network communication protocol upon commencement of a communication session with the network; and subsequently assign the device a second address corresponding to the second network communication protocol based upon a need for communication with the at least one second network node, wherein the second address is usable for a variable period of time that is set according to a network-determined factor;

wherein the first address is an Internet Protocol version 6 (IPv6) address, and the second address is an Internet Protocol version 4 (IPv4) address;

wherein the network-determined factor comprises whether the device has communication capabilities using only the second network communication protocol or with both the first network communication protocol and the second network communication protocol, wherein the period of time is greater if the device has communication capabilities using only the second network communication protocol compared to if the device has communication capabilities using both the first network communication protocol and the second network communication protocol.

21. The wireless communication network of claim 20, wherein the network access point is further operable to send a termination request operable to cause the mobile wireless communication device to release the IPv4 address prior to expiration of the period of time, wherein the termination request is based on a level of exhaustion of a supply of IPv4 addresses in the network.

22. The wireless communication network of claim 20, wherein the network access point is further operable to receive a release from the device of the IPv4 address upon expiration of the period of time.

23. The wireless communication network of claim 20, wherein the network access point is further operable to send the mobile wireless communication device a message to release the IPv4 address in response to determining the expiration of the period of time.

24. The wireless communication network of claim 20, wherein the network access point is further operable to receive a request from the mobile wireless communication device for the IPv4 address, wherein the request comprises an Internet Protocol Control Protocol version 4 (IPCPv4) request.

25. The wireless communication network of claim 20, wherein the network access point is further operable to receive a registration request from the mobile wireless communication device for the IPv4 address, and wherein the network access point is further operable to send the IPv4 address with a registration reply.

26. The wireless communication network of claim 20, wherein the network access point is further operable to send to the mobile wireless communication device the IPv4 address automatically upon commencement of a communication session when IPv6 service is not available.

27. The wireless communication network of claim 20, wherein the device does not consume an Internet Protocol version 4 (IPv4) address unless IPv4 communication is needed with an IPv4 network resource.

28. The wireless communication network of claim 20, wherein the network access point is further operable to send to the device a termination request operable to release the second address corresponding to the second network communication protocol prior to the expiration of the period of time, wherein the termination request is sent when no IPv4 traffic by the device is detected for a set time.

29. The network of claim 20, wherein the network-determined factor comprises consumption of second addresses in the network, wherein the period of time is reduced with increasing consumption.

30. A tangible computer-readable medium encoded with computer executable instructions, the computer executable instructions being executable to:
   use for a mobile wireless communication device a first address corresponding to a first network communication protocol upon commencement of a communication session with a network resource in a network supporting the first network communication protocol and a second network communication protocol; and
   subsequently request for the mobile wireless communication device a second address corresponding to the second network communication protocol if the network resource uses the second network communication protocol, wherein the second address is usable for a variable period of time that is set according to a network-determined factor;
   wherein the first address is an Internet Protocol version 6 (IPv6) address, and the second address is an Internet Protocol version 4 (IPv4) address;
   wherein the network-determined factor comprises whether the device has communication capabilities using only the second network communication protocol or with both the first network communication protocol and the second network communication protocol, wherein the period of time is greater if the device has communication capabilities using only the second network communication protocol compared to if the device has communication capabilities using both the first network communication protocol and the second network communication protocol.

31. A mobile wireless communication device that uses an Internet Protocol version 6 (IPv6) address upon commencement of a communication session with a network resource in a network supporting the IPv6 and an Internet Protocol version 4 (IPv4), subsequently requests the IPv4 address from the network if the network resource uses the IPv4, receives the IPv4 address from the network for an assigned period of time and releases the IPv4 address to the network prior to expiration of the assigned period of time, wherein use of the IPv6 and IPv4 address avoids a need for translations between address spaces of the IPv6 communication protocol and the IPv4 communication protocol;
   wherein the Internet Protocol version 4 (IPv4 address is usable for a variable period of time that is set according to a network-determined factor;
   wherein the network-determined factor comprises whether the device has communication capabilities using only the Internet Protocol version 4 (IPv4 ) address or with both the Internet Protocol version 6 (IPv6 address and the Internet Protocol version 4 (IPv4) address, wherein the period of time is greater if the device has communication capabilities using only the Internet Protocol version 4 (IPv4 ) address compared to if the device has communication capabilities using both the Internet Protocol version 6 (IPv6 address and the Internet Protocol version 4 (IPv4 address.

32. The device of claim 31, wherein the device releases the IPv4 address prior to the expiration of the assigned period of time upon receipt of a termination request by the network, the termination request being sent when the IPv4 addresses are scarce.

33. The device of claim 31, wherein the device releases the IPv4 address prior to the expiration of the assigned period of time upon receipt of a termination request by the network, the termination request being sent when no IPv4 traffic by the device is detected by the network for a set time.

34. A mobile communication device that initiates in a network a communication session according to an IPv6 protocol and using an IPv6 address, receives an IPv4 address for communicating to an IPv4 network resource for variable period of time that is set according to a function of the consumption of IPv4 addresses in the network, wherein an expiration of the period of time is operable to release the IPv4 address, wherein use of the IPv6 and IPv4 address avoids a need for translations between address spaces of the IPv6 communication protocol and the IPv4 communication protocol;
   wherein the Internet Protocol version 4 (IPv4 address is usable for a variable period of time that is set according to a network-determined factor;
   wherein the network-determined factor comprises whether the device has communication capabilities using only the Internet Protocol version 4 (IPv4 address or with both the Internet Protocol version 6 (IPv6 ) address and the Internet Protocol version 4 (IPv4 address, wherein the period of time is greater if the device has communication capabilities using only the Internet Protocol version 4 (IPv4 address compared to if the device has communication capabilities using both the Internet Protocol version 6 (IPv6) address and the Internet Protocol version 4 (IPv4) address.

35. The device of claim 34, wherein the device releases the IPv4 address prior to the expiration of the assigned period of time upon receipt of a termination request by the network, the termination request being sent when the IPv4 addresses are scarce.

36. The device of claim 34, wherein the device releases the IPv4 address prior to the expiration of the assigned period of time upon receipt of a termination request by the network, the termination request being sent when no IPv4 traffic by the device is detected by the network for a set time.

37. A mobile wireless communication device comprising:
   means for using for a mobile wireless communication device a first address corresponding to a first network communication protocol upon commencement of a communication session with a network resource in a network supporting the first network communication protocol and a second network communication protocol;
   means for subsequently requesting for the mobile wireless communication device a second address corresponding to the second network communication protocol if the network resource uses the second network communication, wherein the second address is usable for a variable period of time that is set according to a network-determined factor;
   wherein the first address is an Internet Protocol version 6 (IPv6 address, and the second address is an Internet Protocol version 4 (IPv4 address;
   wherein the network-determined factor comprises whether the device has communication capabilities using only the second network communication protocol or with both the first network communication protocol and the second network communication protocol, wherein the period of time is greater if the device has communication capabilities using only the second network communication protocol compared to if the device has communication capabilities using both the first network communication protocol and the second network communication protocol.

* * * * *

UNITED STATES PATENT AND TRADEMARK OFFICE
CERTIFICATE OF CORRECTION

| | |
|---|---|
| PATENT NO. | : 7,701,958 B2 |
| APPLICATION NO. | : 10/188654 |
| DATED | : April 20, 2010 |
| INVENTOR(S) | : Abrol et al. |

It is certified that error appears in the above-identified patent and that said Letters Patent is hereby corrected as shown below:

Column 08, line 41, claim 4: "Ipv4" to read as --IPv4--

Column 08, line 49, claim 6: "Ipv4" to read as --IPv4--

Column 08, line 57, claim 9: "(IPv4 )" to read as --(IPv4)--

Column 09, line 30, claim 13: "tune" to read as --time--

Column 10, line 63, claim 27: "(IPv4 )" to read as --(IPv4)--

Column 11, line 46, claim 31: "address" to read as --addresses--

Column 11, line 48, claim 31: "(IPv4" to read as --(IPv4)--

Column 11, line 53, claim 31: "(IPv4 )" to read as --(IPv4)--

Column 11, line 54, claim 31: "(IPv6" to read as --(IPv6)--

Column 11, line 58, claim 31: "(IPv4 )" to read as --(IPv4)--

Column 11, line 61, claim 31: "(IPv4" to read as --(IPv4)--

Column 12, line 13, claim 34: "address" to read as --addresses--

Column 12, line 16, claim 34: "(IPv4" to read as --(IPv4)--

Column 12, line 21, claim 34: "(IPv4" to read as --(IPv4)--

Column 12, line 22, claim 34: "(IPv6 )" to read as --(IPv6)--

Column 12, line 23, claim 34: "(IPv4" to read as --IPv4--

Column 12, line 26, claim 34: "(IPv4" to read as --(IPv4)--

Column 12, line 31, claim 35: "the assigned period" to read as --an assigned period--

Column 12, line 36, claim 36: "the assigned period" to read as --an assigned period--

Column 12, line 55, claim 37: "(IPv6" to read as--(IPv6)--

Column 12, line 56, claim 37: "(IPv4" to read as --IPv4--

Signed and Sealed this
Twenty-fourth Day of July, 2012

David J. Kappos
*Director of the United States Patent and Trademark Office*